Patented Sept. 25, 1928.

1,685,407

UNITED STATES PATENT OFFICE.

CHARLES MANNICH, OF FRANKFORT-ON-THE-MAIN, GERMANY.

DICYCLIC DERIVATIVES OF PENTAMETHYLENE AND PROCESS FOR THE MANUFACTURE OF SAME.

No Drawing. Application filed October 15, 1926, Serial No. 141,887, and in Germany October 27, 1925.

It is already known that when treating the reaction products of β-keto-pentamethylene-carbonic-acid-ethyl-esters with hydrazine, alcohol is very easily split off with ring-formation, whereby a system of two condensed five-atom-rings is formed. Contrary hereto and in deviation from experiences with the hexamethylene group Dieckmann could not obtain ring-formation with an aromatic substitute for hydrazine (Liebig's Annalen der Chemie, vol. 317, 1901, page 60).

It has now been found that by using alkaline condensing agents ring-formation may easily be obtained. One can start either from purified phenyl-hydrazine or from the raw material. The aromatically substituted trimethylene-pyrazolones thus obtained form easily crystallizing compounds which do not dissolve in water, but dissolve in the usual solvents, such as ethyl-alcohol, methyl-alcohol, and in caustic alkalis. They are to be used as starting materials for the manufacture of dyes and medicines.

*Example 1.*

246 parts of hydrazone obtained from 156 parts of β-keto-pentamethylene-carbonic acid-ethyl-ester and 108 parts of phenyl-hydrazine are mixed with 136 parts of dried sodium ethylate and the mixture is heated slowly to 160° C., preferably in a hydrogen atmosphere. The reaction product thereby acquires a slightly brown colour. During the reaction alcohol distills off. Ring-formation has become complete when the quantity of distilled alcohol has attained 90 parts. The reaction product is dissolved in water and the aqueous solution separated from impurities by shaking with ether. From this solution the condensation product is precipitated with sulphuric acid. For complete purification it is re-crystallized from the 15-fold quantity of ethyl-alcohol (94%). 1-phenyl-3.4-trimethylene-pyrazolone forms slightly coloured crystals which melt at 183–184° C.

The aforesaid successive reactions may be depicted by the following series of equations:

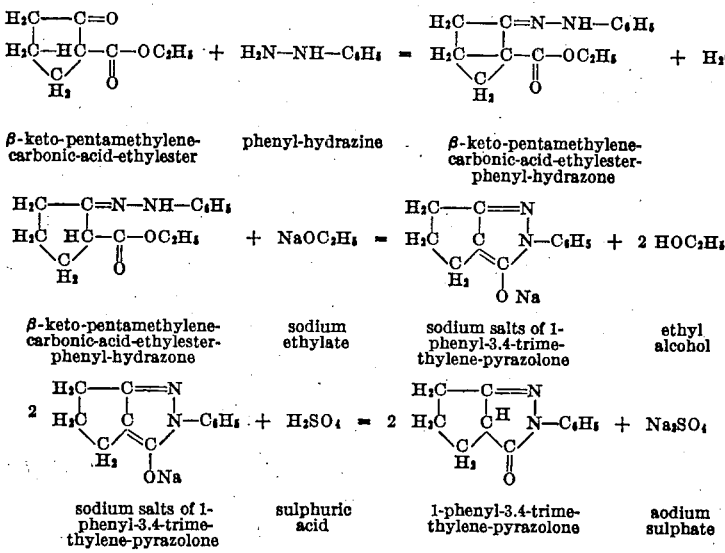

*Example 2.*

142 parts of β-keto-pentamethylene-carbonic-acid-methyl-ester are mixed with 108 parts of phenyl-hydrazine and the mixture is heated, until no more water is given off. 108 parts of sodium methylate are then added and the mixture is heated slowly to about 160° C. Methyl-alcohol distills off. When no more methyl-alcohol is given off, the condensation product is treated in the same manner as described in Example 1.

The structural formula of the product of this example is the same as that of the products of Examples 1, 5, 6, and 7.

*Example 3.*

156 parts of β-keto-pentamethylene-carbonic-acid-ethyl-ester are allowed to act upon 187 parts of para-bromphenyl-hydrazine.

Water is split off and β-keto-pentamethylene-carbonic-acid-ethyl-ester-bromphenyl-hydrazone is obtained which, on being re-crystallized from alcohol, forms crystals melting at 101° C. 325 parts of this hydrazone are mixed with 136 parts of dried sodium ethylate and slowly heated to 160° C. When no more ethyl alcohol is distilled off, the reaction product is dissolved in water, the solution treated with ether, then acid is added and the precipitate re-crystallized from alcohol. A slightly coloured crystalline powder with an acid reaction is thus obtained. 1-para-bromphenyl - 3.4 - trimethylene - pyrazolone melts at 200° C.

The structural formula of the product appears to be as follows:

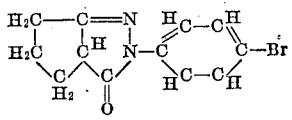

1-para-bromphenyl-3.4-trimethylene-pyrazolone.

*Example 4.*

260 parts of β-keto-pentamethylene-carbonic-acid-ethyl-ester-tolyl-hydrazone, which is obtained by allowing para-tolyl-hydrazine to act upon β-keto-pentamethylene-carbonic-acid-ethyl-ester and which forms crystals melting at 84° C., are heated with 136 parts of well dried sodium ethylate and the mixture is heated in a hydrogen current first to 110° C., and then to 160° C. When no more ethyl-alcohol distills off, the reaction product is treated as described in Example 3. 1-para-tolyl-3.4-trimethylene-pyrazolone thus obtained forms slightly coloured crystals with an acid reaction melting at 202° C.

The structural formula of the product appears to be as follows:

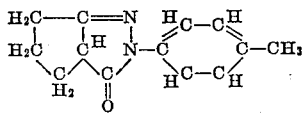

1-para-tolyl-3.4-trimethylene-pyrazolone.

*Example 5.*

To a solution of 246 parts of β-keto-pentamethylene-carbonic-acid-ethyl-ester-phenyl-hydrazone in 750 parts of toluol are added 28 parts of sodium and the mixture is heated for 2 hours in a saline bath. The sodium gradually disappears and a thick yellow mass is obtained, from which the sodium salt of the pyrazolone compound separates. By carefully adding water remnants of sodium are dissolved, then enough water is added to dissolve the precipitated sodium salt, after which the toluol layer is removed. From the aqueous solution 1-phenyl-3.4-trimethylene-pyrazolone is precipitated by the addition of an acid.

*Example 6.*

To a cooled solution of 246 parts of β-keto-pentamethylene - carbonic - acid -ethyl - ester- phenyl-hydrazone in 800 parts of toluol 78 parts of finely powdered sodium amide are added. The reaction soon sets in with considerable heat development. The mixture is left to stand over night and to the thus obtained yellow crystalline mass enough water is added to dissolve the precipitated sodium salt. The toluol layer is removed and 1-phenyl-3.4-trimethylene-pyrazolone is precipitated from the aqueous solution. It is purified by re-crystallization from alcohol.

*Example 7.*

5 parts of β-keto-pentamethylene-carbonic-acid-ethyl-ester phenyl-hydrazone are boiled for 3 hours with 25 parts of anhydrous acetic acid at the reflux condenser. When the excess of anhydrous acetic acid has been distilled off in vacuo the residue is left to stand for a day with 50 parts of a 10 per cent alcoholic solution of potassium hydroxide. The alcohol is then removed in vacuo and the residue dissolved in 30 parts of water. From the strongly alkaline solution, when neutralized with dilute hydrochloric acid, a half-solid mass is separated which falls to powder when stirred with ether. By re-crystallization from alcohol 1-phenyl-3.4-trimethylene-pyrazolone melting at 184° C. is obtained in a pure state.

I claim:

1. As new products the dicyclic derivatives of pentamethylene which may be produced by treating the reaction products of esters of β-keto-pentamethylene-carbonic-acids and aromatic hydrazines with alkaline condensing agents, the new derivatives forming easily crystallizing compounds which do not dissolve in water, but dissolve in the usual solvents, such as ethyl-alcohol, methyl-alcohol, and in caustic alkalis.

2. As new product 1-phenyl-3.4-trimethylene-pyrazolone which may be produced by treating the reaction product of esters of β-keto-pentamethylene-carbonic-acids and phenyl-hydrazine with alkaline condensing agents, the new compound forming slightly coloured crystals melting at 183–184° C., not dissolving in water, but dissolving in the usual solvents, such as ethyl-alcohol, methyl-alcohol, and in caustic alkalis.

3. The process for the manufacture of dicyclic derivatives of pentamethylene which consists in treating the reaction products of esters of β-keto-pentamethylene-carbonic-acids and aromatic hydrazines with alkaline condensing agents.

4. The process for the manufacture of dicyclic derivatives of pentamethylene which consists in treating the reaction products of esters of β-keto-pentamethylene-carbonic-acids and aromatic hydrazines with alkaline condensing agents in a solvent.

5. The process for the manufacture of 1-phenyl-3.4-trimethylene-pyrazolone which consists in treating the reaction products of esters of β-keto-pentamethylene-carbonic-acids and phenyl-hydrazine with alkaline condensing agents.

6. The process for the manufacture of 1-phenyl-3.4-trimethylene-pyrazolone which consists in treating the reaction product of β-keto-pentamethylene-carbonic-acid-ethyl-ester and phenyl-hydrazine with alkaline condensing agents.

7. The process for the manufacture of 1-phenyl-3.4-trimethylene-pyrazolone which consists in treating the reaction product of β-keto-pentamethylene-carbonic-acid-ethyl-ester and phenyl-hydrazine with sodium-ethylate.

In witness whereof I have hereunto set my hand.

CHARLES MANNICH.